2,404,056

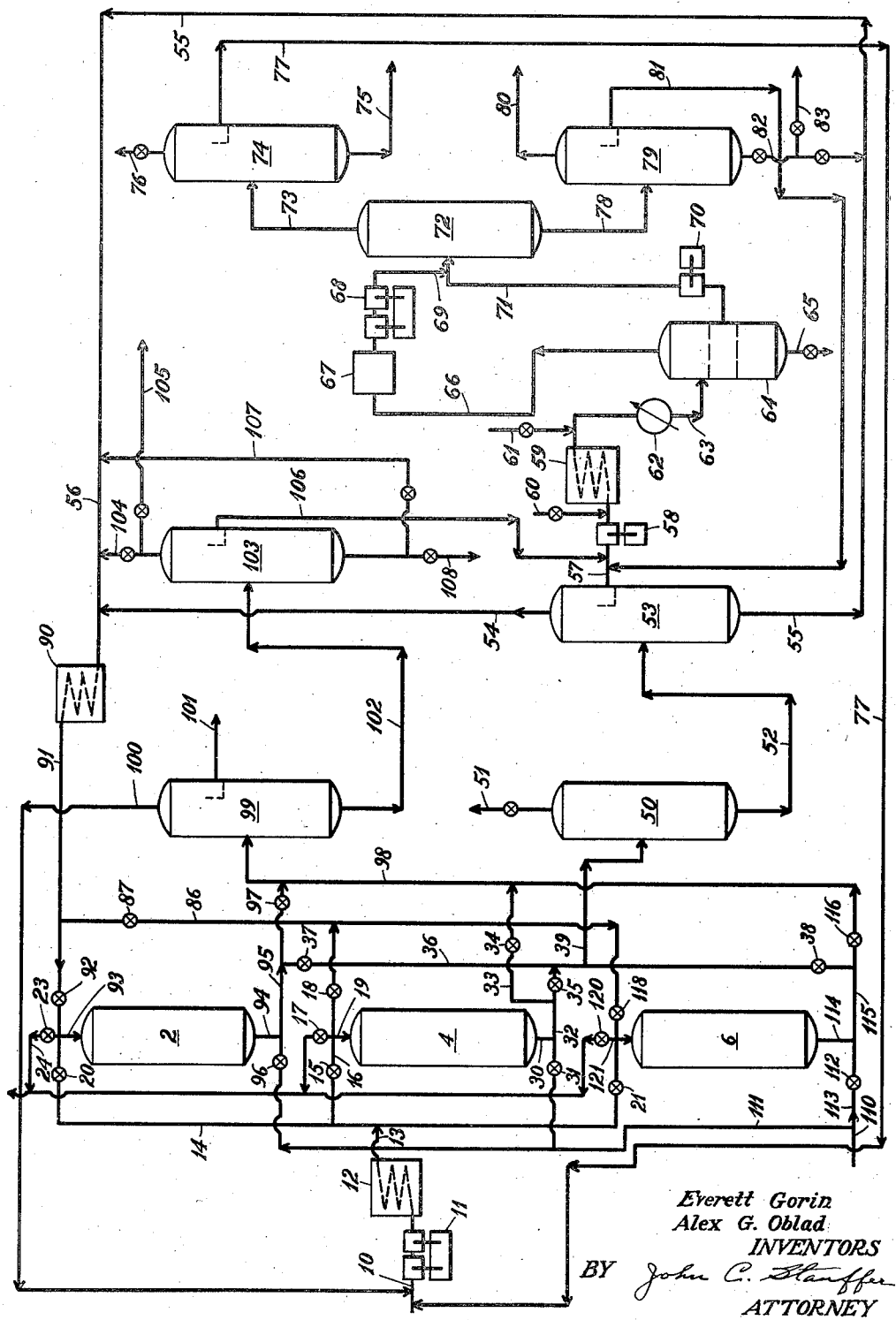
July 16, 1946.  E. GORIN ET AL  2,404,056
MANUFACTURE OF ISOPRENE
Filed Oct. 12, 1944
Everett Gorin
Alex G. Oblad
INVENTORS
BY
ATTORNEY Patented July 16, 1946

UNITED STATES PATENT OFFICE 2,404,056

MANUFACTURE OF ISOPRENE

Everett Gorin and Alex G. Oblad, Dallas, Tex., assignors, by mesne assignments, to Socony-Vacuum Oil Company, Incorporated, New York, N. Y., a corporation of New York Application October 12, 1944, Serial No. 558,438

8 Claims. (Cl. 260—680)

This invention relates to the pyrolytic conversion of hexenes to isoprene. More particularly, this invention relates to a process for the polymerization of propylene and the conversion of propylene dimer polymers obtained thereby under conditions such that the $C_5$ fraction of the pyrolyzed product will contain a high concentration of isoprene, thus making unnecessary further purification prior to use in the compounding of lacquers, varnishes, synthetic resins, etc. In our process, we select that part of the propylene polymer which upon pyrolysis yields isoprene and exclude from the pyrolysis step those components of the polymer which yield other pentadienes and $C_5$ olefins which are difficult to separate from the product in the purification of the isoprene for use in making the above commercial products.

It is known in the art to convert the propylene of a gas stream from various cracking operations to polymers which may be pyrolyzed to produce dienes. For example, U. S. Patent 2,339,560, issued to Martin de Simo et al. teaches and claims such a process. However, relatively low yields of mixed pentadienes are produced when pyrolyzing a mixture of dimers, trimers and tetramers.

Propylene dimer may be divided into two groups of compounds. The first group consists predominantly of 2 methyl pentene-2 with smaller amounts of 2 methyl pentene-1 and 3 methyl pentene-2 and constitutes the 60°–70° C. fraction of the dimer. The second group comprising the remainder of the dimer contains such compounds as 3 methyl pentene-1, 4 methyl pentene-1 and smaller amounts of other hexenes. We have found that the pyrolysis of the first group of compounds results predominantly in the production of isoprene in the $C_5$ fraction of the cracked dimer while the pyrolysis of the remaining components results in the production of considerable amounts of other pentadienes which are difficult to separate from the isoprene in such product cut.

The object of this invention is to produce relatively pure isoprene from propylene containing cracked gas streams. Another object of this invention is to produce relatively pure isoprene from propylene dimer polymer by pyrolytic conversion of the dimer under conditions of temperature, time of reaction and pressure such that the $C_5$ fraction of the pyrolyzed product will contain more than 90 per cent isoprene. A further object of this invention is to fractionate the dimer of propylene to obtain charging stock for pyrolysis comprising predominantly a mixture of 2 methyl pentene-2, 2 methyl pentene-1 and 3 methyl pentene-2 with no more than minor amounts of other hexenes and to obtain therefrom by pyrolysis, a product from which substantially pure isoprene of commercial grade may be obtained by simple fractionation. Still another object of the invention is to fractionate the polymer product obtained by polymerizing propylene to obtain a relatively narrow fraction to be thermally cracked to produce isoprene and higher boiling polymers which may be catalytically cracked to produce propylene for recycle to the polymerization step and additional narrow fraction of selected dimer for recycle to the said thermal cracking step. Other objects of the invention will become apparent from the description thereof which follows.

Our process involves the catalytic polymerization of propylene to produce predominantly 2 methyl pentene-1, 2 methyl pentene-2 and 3 methyl pentene-2. The polymerization is carried out at rather specific conditions to produce high yields of these compounds. Catalysts of the alumina-silica type have been found to produce relatively high yields of dimer. Phosphoric acid, either mounted as a solid on a carrier such as kieselguhr or as liquid phosphoric acid, may be used. However, phosphoric acid in a form other than a dilute aqueous solution, is not as suitable as the alumina-silica catalyst to produce a polymer predominantly dimer. Certain advantages will determine the choice of catalyst. For example, as described hereinafter in one embodiment of the invention, an alumina-silica catalyst such as Gayer catalyst may be used for the polymerization step of our process and then used for the catalytic cracking step before regeneration by controlled combustion of carbonaceous deposit on the catalyst.

If solid catalyst such as alumina-silica catalyst is used in the polymerization step, the propylene containing gas stream is subject to a temperature within the range of 250°–450° C., preferably within the range of 300°–375° C. and at pressures such that the partial pressure of the propylene is within the range of 10 pounds and 100 pounds gauge, preferably 15 to 50 pounds gauge. Space velocities used are such as to produce a maximum of 50 percent cleanup of the propylene in the gas stream for a single pass and will usually lie within the range of from about 50 to 300 volumes of propylene gas at standard conditions of temperature and pressure per volume of catalyst space per hour.

When operating the polymerization step with dilute liquid phosphoric acid catalyst the propylene containing stream is treated at temperatures within the range of from about 200° C. to about 350° C. and at pressures up to 350 atmospheres. Acid concentrations below 40 percent are preferred and the contact time will vary with the concentration of acid, and with the temperature and pressure used for the conversion.

The rate of formation of dimer by this method as a function of acid concentration, temperature and pressure has been determined by Monroe and Gilliland (Ind. & Eng. Chem. 30, 58 (1938)). These data may be used in making a choice of suitable conditions for the operation of the polymerization step of our process. Thus, operation with liquid phosphoric acid catalyst has the advantage of producing high yields of dimer. However, it is less adaptable to large scale commercial operation of our process, a description of which is given hereinbelow in the drawing to which the description refers.

The liquid product from the polymerization step is fractionated and that fraction boiling between 60° C. and 70° C. is thermally cracked at a temperature within the range of from about 700° C. to about 900° C., preferably within the range of from about 775° C. to about 825° C. for a reaction period within the range of from about 0.005 second to about 2.0 seconds. The cracking reaction is preferably carried out at pressures below atmospheric, that is down to as low as 0.10 atmosphere partial pressure of the polymer feed. Steam or substantially oxygen free flue gas is incorporated with feed to reduce the partial pressure of the polymer feed to the desired level. The product from the cracking zone is rapidly quenched to temperatures below about 300° C. and the cracked product is fractionated for the removal of isoprene and butadiene by-product. The unreacted "dimer" and higher boiling polymer is recycled to the thermal cracking zone and the propylene fraction is recycled to the polymerization zone.

The material from the polymerization step boiling higher than 70° C. is subjected to catalytic cracking to produce maximum yield of 60° to 70° C. "dimer" and propylene, and after fractionation of the product the dimer is sent to the thermal cracking step, the propylene being recycled to the polymerization step. The catalytic cracking of these higher boiling polymers is carried out in the presence of alumina-silica catalyst or magnesia-silica catalyst at temperatures within the range of from about 425° C. to about 550° C., preferably from about 450° C. to about 500° C. and at pressures of atmospheric to 15 or 20 pounds gauge. Space velocities should be within the range of from about 0.1 to about 5.0 volumes of liquid hydrocarbon per volume of catalyst space per hour. A desirable space velocity within this range is about 0.2 to 2.0 volumes of liquid polymer per volume catalyst space per hour.

The following example illustrates the polymerization step and the pyrolysis step of our process:

EXAMPLE

Propylene was dimerized by passing the olefin over an alumina-silica catalyst of the Gayer type at a temperature of 360° C. and at 40 pounds gauge pressure. A space velocity of about 230 volumes (S. T. P.) of propylene per volume of catalyst space per hour was maintained to give a yield of 45.8 percent of dimer based on the propylene converted. Approximately 42.8 percent of the propylene feed was converted to polymer. The dimer consisted mainly of 2 methyl pentenes of which 2 methyl pentene-2 predominated. The boiling range of the dimer was approximately 50° C. to 75° C. This material was fractionated to produce a 60°–70° C. fraction which represented approximately 80 percent of the dimer and 36.7 percent of the total polymer produced.

The above 60°–70° C. fraction of the dimer was diluted to 10 volume percent with nitrogen and pyrolyzed at 800° C. under approximately atmospheric pressure and at a contact time of 0.05 second. Under these conditions 71.3 percent of the dimer was decomposed, the main products being methane and isoprene. The yield of isoprene was 46.7 mols per 100 mols of dimer decomposed and the $C_5$ cut consisted of approximately 95 percent isoprene. Other valuable products such as butadiene, isobutene and ethylene were formed in appreciable yield. The volume percent of the various products in the exit gas and their yields are given in the table below.

Table

| Component | Vol. per cent $N_2$ free effluent gas | Mols/100 mols dimer decomposed |
|---|---|---|
| $H_2$ | 3.7 | |
| $CH_4$ | 30.7 | 83.8 |
| $C_2H_4$ | 15.0 | 41.1 |
| $C_2H_6$ | 2.3 | 6.3 |
| $C_3H_6$ | 4.8 | 13.2 |
| $iC_4H_8$ | 3.2 | 8.7 |
| Butadiene, $C_4H_6$ | 5.2 | 14.3 |
| Isoprene, $C_5H_8$ | 17.1 | 46.7 |
| $C_5H_{10} + C_5H_{12}$ | 0.9 | 2.5 |
| $C_6H_{12}$ | 14.8 | |
| $C_7+$ | 2.3 | 6.3 |
| | 100.0 | |

In the embodiment illustrated in the drawing three catalytic reactors are shown as catalyst chambers 2, 4 and 6. These chambers are filled with refractory type catalyst such as Gayer alumina-silica catalyst which is an excellent cracking catalyst as well as a good catalyst for the polymerization of olefins. Hence, by proper arrangement of manifold lines, described hereinbelow, it is possible to utilize any one of the reactors as a polymerization reactor while another is being used as a reaction zone for the catalytic cracking of heavier (boiling above 70° C.) polymer and during the period when the catalyst in the third reactor is being regenerated. As described hereinabove, the freshly regenerated catalyst bed may be used for polymerization after which by changing the flow the partially spent catalyst may be used for the catalytic cracking of heavier polymer fractions.

A gas containing propylene such as a cracked "propane" stream is introduced to the process through line 10 by means of compressor 11 and passes through furnace 12 where it is raised in temperature, preferably to a temperature within the range of 300° to 350° C. The hot gas stream passes via line 13 to manifold line 14, valves 20 and 21 therein being closed. Valve 15 in line 16 is open and valve 18 in line 16 and valve 17 in line 19 are closed thus blocking off tower 4 for the polymerization step as the hot gas passes via lines 16 and 19 to tower 4.

In tower 4 the contact time, temperature and pressure are adjusted to convert less than 50 percent of the propylene stream to polymer in order to produce a polymer containing predominantly propylene dimer inasmuch as this lower polymer is made up substantially of 2 and 3 methyl pentene-2 and 2 methyl pentene-1.

With valve 35 in line 32 open and valves 31, 34, 37 and 38 in lines 32, 33 and 36 respectively closed, the product from reactor 4 passes via lines 30, 32, 33 and 39 to fractionation system 50 for separation of non-condensable gases from condensables and polymer. Non-condensables pass overhead through line 51 and, if desired, may be recycled at least in part to line 10 for removal of additional propylene before discard to fuel. For example, if the initial charge to the polymerization zone contains 50 percent propylene and 50 percent propane while 45 percent of the propylene is converted to polymer per pass and 15 percent of the partially polymerized stream is discarded and 85 percent recycled to the polymerization zone, the overall yield of polymer is increased to 75 percent. The percent propylene in the net feed is reduced to 26.9 percent but by operating at a pressure of 135 pounds gauge the partial pressure of propylene is maintained within the optimum range, namely about 40 pounds gauge.

The bottom fraction from tower 50 is passed via line 52 to fractionator 53 for separation into three fractions, i. e., a fraction boiling below 60° C. comprising primarily 3 and 4 methyl pentene-1 and lower hydrocarbons which pass overhead through lines 54 and 56 to furnace 90 preparatory for the catalytic cracking step for reconversion to propylene described hereinbelow, a polymer fraction boiling above 70° C. which is also passed to said furnace 90 via lines 55 and 56, and the 60° to 70° C. boiling fraction selected for pyrolysis to isoprene. The 60° to 70° C. fraction is withdrawn as a sidestream through line 57 by means of pump 58 and is passed to furnace 59 where it is heated to a temperature within the range of 700°–900° C. in the presence of about 9 volumes of oxygen free flue gas or steam to one volume of vaporized polymer, the diluent gas being introduced to line 57 through valved line 60. The reaction time is adjusted to within the limits of 0.005 and 2.0 seconds, and the product is quickly quenched to a temperature below 300° C. with water introduced to the product effluent line through line 61. The product is further cooled and condensed in cooler 62 and passes via line 63 to separator 64 for separation of condensed water from the pyrolyzed product. The water is drawn off from separator 64 via line 65. Vapors in the vapor space of separator 64 may be drawn off through valved line 66, drier 67 and the water free vapors are transferred via compressor 68 in line 69 for introduction to fractionator 72 with liquid product which is withdrawn from separator 64 by means of pump 70 in line 71.

In fractionator 72, which may represent a stabilization system of more than one fractionation tower, the $C_4$ and lighter hydrocarbons are separated from the $C_5$ and heavier hydrocarbons. The $C_4$ and lighter gases are taken overhead through line 73 to fractionator 74 whence $C_4$ hydrocarbons are withdrawn through line 75 for further processing for the recovery of butadiene by methods well known in the art. Gases which condense at a lower temperature than $C_3$ hydrocarbons are withdrawn from fractionator 74 via line 76 to be used as fuel or for use in other processes requiring methane and ethylene and the $C_3$ fraction is recycled via line 77 to polymerization feed line 10.

The normally liquid product from fractionator 72 consisting of the $C_5$ fraction, unconverted dimer and higher boiling hydrocarbons formed in the pyrolysis step is withdrawn through bottom drawoff line 78 and is passed to fractionator 79 for recovery of the $C_5$ fraction as the overhead product through line 80. As described hereinabove the $C_5$ fraction consists substantially of commercial grade isoprene which can be used without further purification in such products as lacquers, varnishes and for the production of synthetic resins, and this fraction requires a minimum of chemical purification for use in the production of synthetic rubber. Unconverted dimer is withdrawn as a sidestream from fractionator 79 for recycle via line 81 to the pyrolysis step through line 57. As indicated in the table above, the pyrolysis of the dimer yields a small amount of hydrocarbons of more than six carbon atoms. This material is withdrawn from tower 79 through bottom drawoff line 82. It may be passed through lines 55 and 56 to the catalytic cracking step for production of propylene or it may be withdrawn through line 83 for incorporation in motor fuel.

Turning now to the catalytic cracking step, propylene polymer from tower 53, boiling below 60° C. and boiling above 70° C. and passed to furnace 90 as previously described, is heated to a temperature within the range of from about 450° C. to about 500° C. From furnace 90 the heated polymer is passed via lines 91 and 93 to catalyst tower 2 containing a bed of refractory type cracking catalyst such as Gayer alumina-silica catalyst. As stated hereinabove, this catalyst may be freshly regenerated catalyst or it may be partially spent as a result of prior use in the polymerization step of the cycle. The space velocity in tower 2 will vary according to whether or not the catalyst is freshly regenerated or partially spent, and will vary within the range of from about 0.2 to about 2.0 volumes of liquid feed per volume of catalyst space per hour. Tower 2 is isolated from the polymerization and regeneration cycles by closing valve 23 in line 24, valve 20 in line 14, valve 96 in line 111, valve 37 in line 36, valve 87 in line 86 and valve 116 in line 98. The cracked product consisting primarily of propylene, propylene dimer and higher polymers of propylene passes from tower 2 via lines 94, 95, open valve 97 and line 98 to fractionator 99. In tower 99 the $C_3$- fraction which contains minor amounts of lighter gases is separated as an overhead product and is recycled through line 100 to the polymerization feed line 10. Minor amounts of a combined $C_4$ and $C_5$ fraction of high antiknock value are withdrawn from tower 99 as a side stream through line 101 for use in motor fuel blending. The bottom drawoff product from tower 99 consists of propylene polymer of which the dimer in the form of 2 and 3 methyl pentene-2 and 2 methyl pentene-1 predominates. The dimer also includes a minor amount of 3 and 4 methyl pentene-1. This mixture of polymer is passed through line 102 to fractionator 103.

In tower 103 the low boiling 3 and 4 methyl pentene-1 and any $C_5$ material in the bottom product from tower 99 is taken overhead through line 104 leading to line 56 for reconversion to propylene monomer by catalytic cracking as described above, or this material may be withdrawn through line 105 for use in motor fuel blending. A 60° to 70° C. cut containing the desired dimer for pyrolysis is withdrawn as a side stream from tower 103 through line 106 connecting with pyrolysis feed line 57. Higher boiling polymer is withdrawn through line 108 for motor fuel blending or this fraction may also be recycled through line 107 connecting with line 56 to be catalytically cracked to propylene and propylene dimer as described hereinabove.

As indicated hereinabove refractory type catalysts of the alumina-silica type or of the magnesia-silica type become deactivated as a result of the deposition of carbonaceous material when used in hydrocarbon conversion processes. Our continuous process for making commercial grade isoprene is readily adaptable to a three reactor system wherein the third reactor such as reactor 6 containing spent catalyst may be regenerated while the other reactors such as reactors 2 and 4 are on stream for hydrocarbon conversion according to the above description. For example, catalyst tower 6 may be isolated from the polymerization and catalytic cracking operations by closing the following valves: valve 17 in line 13, valve 21 in line 14, valve 38 in line 36, valve 96 in line 111, valve 118 in line 86, and valve 116 in line 93. With valve 112 in line 113 and valve 120 in line 121 open, air or flue gas containing a controlled amount of oxygen is introduced to tower 6 through lines 119, 113 and 114 at sufficiently high temperature to initiate oxidation of the carbonaceous material on the catalyst contained therein. The products of combustion leave tower 6 through line 121 and when the catalyst is completely regenerated it is ready for reuse in the catalytic polymerization step of the cycle. Before the regenerated catalyst is used for the polymerization cycle the temperature of the bed should be lowered by purging with a relatively cold inert gas such as steam, since the exothermic polymerization reaction is carried out at temperatures well below the temperature of the freshly regenerated catalyst. The spent catalyst bed should also be purged of superficial hydrocarbon gases before the regeneration step.

In the description of our process certain accessories such as compressors, pumps, heat exchangers, valves, etc., readily recognized as necessary by those skilled in the art have been omitted for reasons of clarity. Our description is of a single embodiment of the invention and we do not wish to be limited thereto.

We have found that the dimer obtained by polymerizing propylene may be used advantageously to the exclusion of other polymers of propylene as a feed material to a pyrolysis step for producing a product from which relatively high yields of a C₅ hydrocarbon cut may be separated by simple fractionation, said C₅ hydrocarbon cut being sufficiently high in isoprene content to make the same adaptable to use as commercial isoprene without further purification. We have also found that by taking a 60°–70° C. cut of the propylene dimer those compounds which do not readily yield isoprene may be eliminated from the C₅ fraction of the pyrolyzed product thereby providing a final product containing more than 90 percent isoprene.

We claim:

1. The process of producing isoprene comprising the steps of (1) dimerizing propylene over a dimerization catalyst, (2) fractionating the polymerized product to obtain therefrom a cut boiling within the range of from 60° to 70° C., (3) pyrolyzing said 60° to 70° C. cut, and (4) fractionating the pyrolyzed 60° to 70° C. product obtained in step 3 to recover substantially pure isoprene.

2. The process of producing isoprene comprising the steps of (1) polymerizing propylene over a polymerization catalyst under conditions of temperature, pressure and contact time such that less than 50 percent of the propylene is polymerized per pass over said catalyst, (2) fractionating the polymerized product to obtain therefrom a dimer cut boiling within the range of 60° to 70° C., (3) pyrolyzing said 60° to 70° C. cut, and (4) fractionating the pyrolyzed 60° to 70° C. product obtained in step 3 to recover substantially pure isoprene.

3. The process of producing isoprene comprising the steps of (1) polymerizing propylene over a polymerization catalyst, (2) fractionating the polymerized product to obtain therefrom a cut boiling within the range of from 60° to 70° C., (3) pyrolyzing said 60° to 70° C. cut, (4) fractionating the pyrolyzed product from step 3 to obtain substantially pure isoprene, propylene, and propylene polymer, and (5) recovering said isoprene from step 4, recycling the propylene from step 4 to the polymerization step described in step 1 and recycling said propylene polymer of step 4 to step 3.

4. The process of producing a C₅ hydrocarbon fraction containing more than 90 percent isoprene said process comprising the steps of (1) polymerizing propylene over a polymerization catalyst under conditions favorable for the production of large yields of propylene dimer, (2) fractionating the polymerized product to obtain therefrom a cut boiling at atmospheric pressure within the range of from 60° to 70° C., (3) pyrolyzing said 60° to 70° C. cut, and (4) fractionating the pyrolyzed 60° to 70° C. product obtained in step 3 to recover said C₅ cut containing more than 90 percent isoprene.

5. The process of producing isoprene from a mixture of 2 methyl pentene-1, 2 methyl pentene-2 and 3 methyl pentene-2 comprising the steps of (1) dimerizing propylene over a catalyst, (2) fractionating the dimerized product to obtain a cut containing said 2 methyl pentene-1, 2 methyl pentene-2 and 3 methyl pentene-2 mixture said cut boiling at atmospheric pressure within the range of from 60° to 70° C., (3) pyrolyzing said 60° to 70° C. cut obtained in step 2, and (4) fractionating the product from step 3 to obtain a C₅ hydrocarbon cut containing said isoprene.

6. The process of producing isoprene comprising the steps of (1) polymerizing propylene over a catalyst under conditions of temperature, pressure and contact time such that substantial yields of propylene dimer are produced, (2) fractionating the polymerized product to obtain therefrom a fraction boiling at atmospheric pressure within the range of 60° to 70° C., a polymer cut boiling below 60° C. at atmospheric pressure and a polymer cut boiling above 70° C. at atmospheric pressure, (3) pyrolyzing said 60° to 70° C. fraction obtained from step 2 at a temperature within the range of 700° and 900° C., (4) fractionating the product of pyrolysis obtained in step 3 to recover a C₄ cut rich in butadiene, a C₅ fraction containing at least 90 percent isoprene and a dimer cut for recycle to said pyrolysis step 3, (5) catalytically cracking said polymer cut boiling below 60° C. and said polymer cut boiling above 70° C. obtained in step 2, (6) fractionating the catalytically cracked product from step 5 to obtain a C₃ fraction and a propylene dimer fraction boiling at atmospheric pressure in the range of from 60° to 70° C., and (7) recycling said C₃ fraction from step 6 to the polymerization step 1 and recycling the propylene dimer fraction from step 6 to said pyrolysis step 3.

7. The process as described in claim 6 wherein the catalyst employed in the polymerization step and in the cracking step is an alumina-silica type catalyst.

8. The process as described in claim 6 wherein the catalyst employed in the cracking step is alumina-silica catalyst partially spent in the polymerization step.

EVERETT GORIN.
ALEX G. OBLAD.